United States Patent
Vriend

[15] 3,677,611
[45] July 18, 1972

[54] ISOLATOR VALVE FOR PNEUMATIC BRAKE SYSTEMS

[72] Inventor: Joseph A. Vriend, P.O. Box 505, Squamish, British Columbia, Canada

[22] Filed: July 23, 1970

[21] Appl. No.: 57,437

[52] U.S. Cl. ............................................. 303/84 A, 137/118
[51] Int. Cl. ........................................................ B60t 17/22
[58] Field of Search .............. 137/118; 188/151 A; 200/81.9; 303/84 A, 84 R; 340/52 C

[56] References Cited

UNITED STATES PATENTS

| 2,353,535 | 7/1944 | Young | 303/84 A |
| 3,148,364 | 9/1964 | Engels et al. | 303/84 A X |
| 3,314,047 | 4/1967 | Zincke et al. | 137/118 X |

FOREIGN PATENTS OR APPLICATIONS

| 1,115,245 | 12/1955 | France | 303/84 A |

Primary Examiner—Duane A. Reger
Attorney—Fetherstonhaugh & Co.

[57] ABSTRACT

A valve having a disc mounted in a valve chamber for limited rocking movement in any direction about a centrally disposed pivot. The valve chamber has outlet ports connected by lines to the brakes of a vehicle and arranged in a circle within the circumference of the valve disc and also an inlet port opposite the outlet ports. The valve disc is supported in a normally open and balanced position when air pressure at the outlet ports is substantially equal but, when a predetermined drop in pressure is sensed at one of the outlet ports, as would occur if the brake line connected to that outlet port was ruptured, then the valve disc is rocked to close off that particular outlet port while the remaining outlet ports are kept fully open to operate the brakes of the remaining wheels of the vehicle. The valve disc is included in an electric circuit which is energized whenever the valve disc is rocked to close off an inlet port and a warning device in the electric circuit tells the driver of the vehicle which brake line is ruptured.

7 Claims, 4 Drawing Figures

Patented July 18, 1972
3,677,611
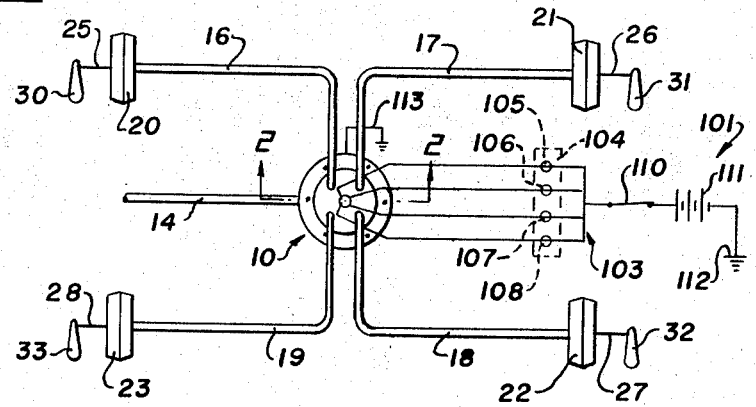
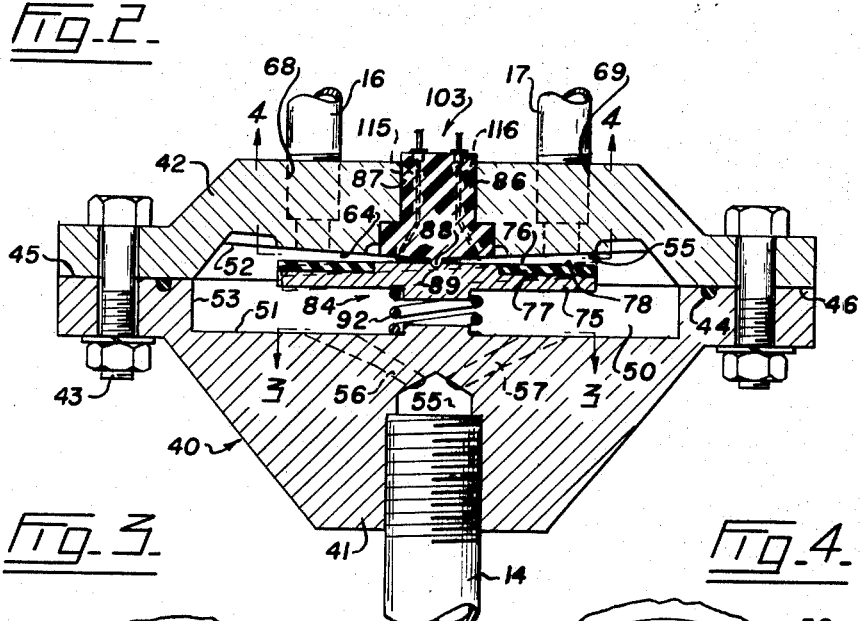
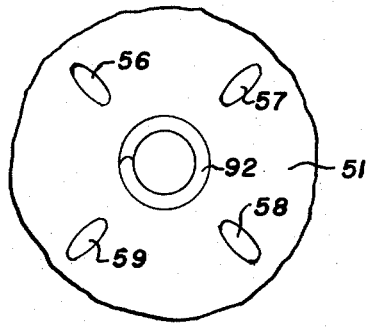
INVENTOR
JOSEPH A. VRIEND
BY
Featherstonhaugh & Co.
ATTORNEYS

ISOLATOR VALVE FOR PNEUMATIC BRAKE SYSTEMS

My invention relates to improvements in valves for pneumatic brake systems.

Trucks, buses, and other heavy vehicles which are equipped with air brakes are difficult to control and bring to a halt if the brake operating pressure at one wheel or set of wheels is lost or reduced below an effective level. Nearly all parts of a pneumatic brake system are subject to wear and in particular the flexible hoses which connect the supply lines to the brake chambers are quite easily ruptured by a flying stone or the like. It has been suggested before that a safety valve be included in the brake system to shut off air to a leaking hose but conventional valves of this type have a number of disadvantages which are objected to by many vehicle operators. For example, some safety valves are quite costly to install and require frequent maintenance to keep them in fully serviceable condition. Others will operate with reasonable effectiveness to control the flow of fluid to one end, in some cases, to two air lines but, when the system has four or more lines as is often the case, several such valves have to be used and the braking system becomes undesirably complex.

I have overcome the above as well as other disadvantages of conventional air valves by providing a simply constructed and relatively inexpensive valve which will function to control the supply of air to two or more lines depending on the type of system installed in the vehicle. The present valve has a self-cleaning action which keeps it operational without too frequent maintenance and in spite of the presence of moisture, oil sludge, grit and alcohol vapors, all of which are found in air brake systems and are the frequent cause of breakdowns. My isolator valve is sensitive enough to react to quite a small drop in operating pressure in any one line so as to detect the presence of a slow leak in a hose or elsewhere. The valve is provided with an alarm circuit which informs the driver of the vehicle of the failure in some part of the brake system and assists him in locating the part which needs attention.

In the drawings which illustrate a preferred embodiment of the invention;

FIG. 1 is a schematic view showing the isolator valve and the signaling means therefore connected into a typical air brake system, FIG. 2 is an enlarged vertical section of the valve and taken on the line 2—2 of FIG. 1, FIG. 3 is a section taken on the line 3—3 of FIG. 4, and FIG. 4 is a section taken on the line 4—4 of FIG. 2.

Referring to FIG. 1, the numeral 10 indicates generally the present isolator valve which is shown connected into an air brake system 12 of a heavy truck or the like. By way of example, the simplified system 12 illustrated in FIG. 1 may be considered as the type used for a truck having twin rear axles of which four single wheels or, alternatively four dual wheels, are mounted. Many of the component parts of the system 12 which hereinafter will be referred to have been purposely omitted for the sake of clarity but the circuit is shown to comprise a line 14 which connects the valve 10 to a source of air pressure, for example, a reservoir which is maintained at a suitable operating pressure by the air compressor of the vehicle. Lines 16 to 19 connect valve 10 to brake chambers 20 to 23, there being one such brake chamber for each wheel. Chambers 20 to 23 are fitted with the usual diaphragms which are operatively connected by rods 25 to 28 and levers 30 to 33 to the brake mechanism of the wheels. The supply line 14 is also connected to the brake valve and pedal therefor of the vehicle so that when said pedal is depressed, air under a suitable high operating pressure is fed through valve 10 to the chambers 20 to 23 whereupon the brakes of all four wheels are applied. Each of the lines 16 to 19 normally is fitted with a quick relief valve to exhaust air from an adjacent brake chamber when the brake pedal is released. If desired, a suitable quick relief valve can be built directly into the valve 10 to combine the operations of the two valves.

Referring now to FIG. 2, the isolator valve 10 is shown to comprise a body 40 formed of a base 41 and a cover 42. The two parts making up the body 40 are secured together by bolts 43 and an O-ring gasket 44 is positioned between abutting faces 45 and 46 of the base and cover to provide an air-tight seal therebetween.

The upper face 45 of the base and the lower face 46 of the cover has complementary recesses which provide a valve chamber 50 in the body 10. Chamber 50 has a lower end wall 51, an upper end wall 52, and a peripheral wall 53. The supply line 14 is threaded or otherwise secured within an outlet port 55 formed in the center of the base 41. Port 55 has branch passages 56 to 59 which connect with the chamber 50, see particularly FIG. 3. The inlet port branch passages 56 to 59 are spaced 90° apart and are arranged in a circle around the vertical axis of the body 40. Also, the branch passages 56 to 59 are disposed at an acute angle to the vertical axis of the body 40 as shown in FIG. 2 so as to be directed towards the peripheral wall 53 of the valve chamber.

The upper end wall 52 of the valve chamber is provided with an annular valve seat 64 which slopes downwardly and inwardly at a very slight angle to the horizontal face 46 of the cover. Cover 42 has outlet ports 68 to 71, see particular FIG. 4, which ports extend through the valve seat 64 to connect with the chamber 50. Lines 16 to 19 have their ends suitably connected into the outlet ports 68 to 71 respectively.

The isolator valve 10 is provided with a valve disc 75 formed of a flattened, circular metal plate. On upper face 76 of the valve disc there is a wide rabbet or recess 77 and suitably secured within this recess is an annular band 78. A resilient material such as rubber or plastic is used to form the band 78 and preferably the material is treated to resist the deteriorating effect of oil and acid.

Mounting means generally indicated at 84 supports the valve disc 75 within the chamber 50. As shown in FIG. 2, the mounting means 84 comprises a plug 86 which is seated in an opening 87 formed in the center of the cover 42. Plug 86 is provided with a centrally disposed and semi-spherical pivot 88 which projects downwardly into the valve chamber 50. A similarly shaped recess 89 is formed in the center of the upper face 76 of the valve disc and the pivot 88 is received in this recess. A centrally disposed compression spring 92 is interposed between the disc 75 and the lower end wall 51 to hold said disc against the plug 86. Thus, the mounting means 84 supports the valve disc 75 so that it can rock about the pivot 88 to a limited extent and in any direction. In other words, any part of the band 78 can be moved into and out of contact with a corresponding part of the valve seat 64 so as to close off one of the outlet ports 68 to 71. The rocking or tilting movement of the valve disc is resisted to a slight extent by a compression spring 92 which is calibrated to apply a predetermined force against said disc for reasons which will be made apparent later.

When the driver of this vehicle depresses the brake pedal, air under high pressure flows through the port 55 and discharges into the valve chamber 50 from the branch passages 56 to 59. These branch passages are directed towards the peripheral wall 53 and also the perimeter of valve disc 75 and therefore the four streams of pressurized air charge the valve chamber without disturbing the equilibrium of said valve disc which remains in the normally opened position shown by solid lines in FIG. 2. Air discharges through the outlet ports 68 to 71 and is conducted by the lines 16 to 19 to pressurize the brake chambers 20 to 23 whereupon the brakes of all four wheels of the vehicle are applied. As long as the system 12 is functioning normally, the valve 10 remains open with the disc 75 balanced or undisturbed by the passage of air through the chamber 50. It will be noted, the valve disc 75 does not obstruct or strangle the outlet ports 68 to 71 and the flow of air is not impeded to any appreciable extent by the presence of the valve 10 in the system 12. Since the passage of air through the valve 10 is smooth and unobstructed, any contaminants which may be entrained in the air stream can move into and out of the valve without settling therein and jamming any of its operating parts.

Assuming there is a break in, say, line 17 and air is being lost through this break, the next time the vehicle's brakes are applied a pressure drop occurs within port 69. Air pressure within the chamber 50 continues to exert an upward force on the underside of the disc 75. The pressure differential between the port 69 and the chamber 50 causes the disc 75 to tilt to the dotted line position of FIG. 2. This tilting or rocking motion of the disc 75 brings the band 78 into sealing engagement with the valve seat 64 in the vicinity of the port 69 whereupon that port is closed off and the ruptured line 17 is isolated from the remainder of the system 12. The other three brake chambers 20, 22, and 23 continue to be supplied with pressurized air as before and the three sets of brakes operated by these chambers can then be applied to bring the vehicle to a halt.

The isolator valve 10 is provided with signalling means generally indicated at 101 which warns the driver of the vehicle when the system 10 becomes partially defective because of a leak in one of the lines or for any other reason such as the failure of a diaphragm in a brake chamber. In FIG. 1, the signalling means 101 is shown to comprise an electric circuit 103 in which a warning device 104 is included. Device 104 is mounted in the cab of the truck and preferably is provided with warning lights 105 to 108, there being one such light for each of the four main parts of the system 12. A normally closed control switch 110 is provided in the circuit 103, which circuit includes the battery 111 of the vehicle and a ground 112. Another ground 113, see FIG. 3, is included in circuit 103 and this ground is connected to the body 40. Disc 75 is connected into the circuit 103 through spring 92, body 40 and the ground 113.

The plug 86 is formed of a suitable insulating material and is fitted with contacts 115 to 118, see FIGS. 2 and 4. These contacts extend through the plug 86 and are suitably connected into the circuit 103. The lower ends of the contacts 115 to 118 project a short distance below the lower face of the plug 86, the contacts being arranged so that each lower end thereof is radially aligned with one of the outlet ports 68 to 71, see particularly FIG. 4. Thus, when the valve disc 75 is tilted to close off outlet port 68 for example, contact 115 is engaged by the upper face 76 of the valve disc and the circuit 103 is completed to energize the warning light 105. The driver notes the location of the defective part of the system 10 and has that part attended to at the first opportunity.

From the foregoing, it will be apparent I have provided a simple yet extremely effective device for isolating any portion of an air system which has become defective and for informing the driver that the brakes of his vehicle require maintenance. The normally open isolator valve does not interfere in any way with normal operation of the pneumatic system and is closed only when a selected pressure drop occurs in some part of the system. The pressure at which the isolator valve 10 will operate can be varied within reasonable limits by altering the strength of the spring 92 which holds the valve disc 75 against the pivot 88. The compression spring chosen must be depressed slightly on one side in order for the disc 75 to rock and therefore the selected spring exerts a force which is proportionate to the predetermined pressure drop required to bring about the closing action of the valve. Thus, the present isolator valve is readily adaptable for use in quite a wide variety of pneumatic brake systems. Valve 10 will operate in response to a pressure drop of say, 10 p.s.i. or more at one of the outlet ports but the spring 91 ensures that the valve remains open if a minor leak occurs of less than that amount which might not effect the braking action and therefore would not require immediate servicing.

I claim:

1. A valve comprising a body having a valve chamber provided with an end wall, an annular valve seat formed on the end wall said valve seat sloping inwardly towards the center of the end wall, said body having a plurality of outlet ports extending through the end wall to connect with the valve chamber, a valve disc, mounting means supporting the valve disc on the valve seat in spaced relation to the end wall and for rocking movement in any direction about the center of said valve disc, said body having an inlet port connecting with the valve chamber on the side of the valve disc remote from the outlet ports, said valve disc normally being maintained in a state of equilibrium by a flow of pressure fluid through the valve chamber and being rocked to close off one outlet port in response to a predetermined fluid pressure drop within said one outlet port.

2. A valve as claimed in claim 1, and including an annular band of resilient material mounted on the valve disc adjacent the perimeter thereof to engage the annular valve seat.

3. A valve as claimed in claim 1, in which said mounting means includes a compression spring biasing the valve disc towards the end wall.

4. A valve as claimed in claim 1, in which inlet port is aligned with the center of the valve disc and has branch passages connecting with the valve chamber, said branch passages being directed towards the perimeter of the valve disc with one branch passage substantially opposing each outlet port.

5. A valve as claimed in claim 1, and including an electric circuit connecting the valve disc to a signalling device, to a source of electric power, and to contacts supported within the valve chamber one adjacent each outlet port and in a position to be engaged by the valve disc when closing off an adjacent outlet port.

6. A valve as claimed in claim 3, in which said compression spring bias the valve disc towards said one end wall with a force proportionate to the predetermined fluid pressure drop required to rock said valve disc to a closed position.

7. A valve as claimed in claim 1, in which said signalling device including means for indicating an outlet port at which a predetermined fluid pressure drop occurs.

* * * * *